United States Patent
Akrotirianakis et al.

(10) Patent No.: US 8,775,136 B2
(45) Date of Patent: Jul. 8, 2014

(54) PRIMAL-DUAL INTERIOR POINT METHODS FOR SOLVING DISCRETE OPTIMAL POWER FLOW PROBLEMS IMPLEMENTING A CHAIN RULE TECHNIQUE FOR IMPROVED EFFICIENCY

(75) Inventors: Ioannis Akrotirianakis, Plainsboro, NJ (US); Andrey Torzhkov, Lafayette, CA (US)

(73) Assignee: Siemens Aktiengesellschaft, Munich (DE)

( * ) Notice: Subject to any disclaimer, the term of this patent is extended or adjusted under 35 U.S.C. 154(b) by 293 days.

(21) Appl. No.: 13/310,829

(22) Filed: Dec. 5, 2011

(65) Prior Publication Data

US 2012/0150504 A1 Jun. 14, 2012

Related U.S. Application Data

(60) Provisional application No. 61/422,236, filed on Dec. 13, 2010.

(51) Int. Cl.
- *G06F 7/60* (2006.01)
- *G06F 17/00* (2006.01)
- *H02J 3/00* (2006.01)

(52) U.S. Cl.
CPC ............. *G06F 17/00* (2013.01); *Y02E 60/76* (2013.01); *Y04S 10/545* (2013.01); *Y02E 40/76* (2013.01); *H02J 2003/007* (2013.01); *Y04S 40/22* (2013.01)
USPC .......................................................... 703/2

(58) Field of Classification Search
USPC .......................................................... 703/2
See application file for complete search history.

(56) References Cited

U.S. PATENT DOCUMENTS

| | | | |
|---|---|---|---|
| 5,625,751 A * | 4/1997 | Brandwajn et al. ............ 706/20 |
| 6,021,402 A | 2/2000 | Takriti | |
| 6,625,520 B1 | 9/2003 | Chen et al. | |
| 6,775,597 B1 | 8/2004 | Ristanovic et al. | |
| 7,660,649 B1 | 2/2010 | Hope et al. | |
| 7,839,125 B2 | 11/2010 | Berggren et al. | |
| 2006/0112049 A1 | 5/2006 | Mehrotra et al. | |
| 2008/0010245 A1 | 1/2008 | Kim et al. | |

OTHER PUBLICATIONS

Machado et al., An Optimal Power Flow with User-Defined Objective Functions and Constraints, Aug. 22-26, 2005, 15th PSCC, Liege, Session 21, Paper 3, pp. 1-7.*

Seungwon An, Natural Gas and Electricity Optimal Power Flow (Thesis), May 2004, pp. 1-107.*

Orfanogianni et al., Increased OPF code development efficiency by integration of general purpose optimization and derivative computation tools, 1999, Power Industry Computer Applications, pp. 123-129.*

(Continued)

*Primary Examiner* — Dwin M Craig
*Assistant Examiner* — Juan Ochoa

(57) ABSTRACT

A solution to the optimal power flow (OPF) problem for electrical generation and distribution systems utilizes a reconfiguration of the OPF problem that allows for a simplified analysis and resolution of a network-based OPF problem in a minimal number of iterations. The standard mixed integer quadratic problem (MIQP) definition is be reconfigured, using the chain rule, to a relatively compact linear system of six equations with six unknowns (the smallest reducible (atomic) problem). Advantageously, the reduction in the complexity of the problem does not require any assumptions and yields a solution equivalent to the original problem.

8 Claims, 2 Drawing Sheets

(56) References Cited

OTHER PUBLICATIONS

Weber and Overbye, An individual Welfare Maximization Algorithm for Electricity Markets, Aug. 2002, IEEE Transactions on Power Systems, vol. 17, No. 3, pp. 590-596.*

Weber and Overbye, A Two-Level Optimization Problem for Analysis of Market Bidding Strategies, Feb. 1999, Proceedings of IEEE Power Engineering Society Summer Meeting, vol. 2, pp. 682-687.*

Chain rule—Wikipedia, printed Mar. 16, 2014, pp. 1-12.*

Wang et al., "On Computational Issues of Market-Based Optimal Power Flow", IEEE Transacions on Power Systems, vol. 22, No. 3, Aug. 2007, pp. 1185-1193.

Dosano, "A Modified Formation of Nonlinear Interior Point Method Based Optimal Power Flow Considering Discrete Control Variables", The International Conference on Electrical Engineering 2008, No. O-080, 4 pages.

K.S. Pandya et al., A Survey of Optimal Power Flow Methods, Journal of Theoretical and Applied Information Technology, vol. 4, No. 5, p. 450 (May 31, 2008).

* cited by examiner

PRIMAL-DUAL INTERIOR POINT METHODS FOR SOLVING DISCRETE OPTIMAL POWER FLOW PROBLEMS IMPLEMENTING A CHAIN RULE TECHNIQUE FOR IMPROVED EFFICIENCY

CROSS-REFERENCE TO RELATED APPLICATIONS

This application claims the benefit of U.S. Provisional Application No. 61/422,236, filed Dec. 13, 2010 and herein incorporated by reference.

TECHNICAL FIELD

The present invention relates to the field of electrical power generation and distribution systems and the optimal power flow (OPF) analysis thereof.

BACKGROUND OF THE INVENTION

The global electric industry is facing a number of challenges: an aging infrastructure, growing demand, and rapidly changing markets, all of which threaten to reduce the reliability of the electricity supply. Deregulation of the electricity supply industry continues, and the drive to increase efficiencies in power systems have been particularly relevant in the attempt to develop new processes for intelligent observation and management of the grid.

Increasing demand due to economic and demographic variations, without additional generation investments, has led transmission and distribution systems worldwide to their limits of reliable operation. According to the North American Electric Reliability Council (NERC), transmission congestion is expected to continue over the next decade. Growth in demand and the increasing number of energy transactions continue to outstrip the proposed expansion of transmission systems.

Thus, a primary objective of operation and security management in the electric industry is to maximize the infrastructure use while concurrently reducing the risk of system instability and blackouts. To that end, the "optimal power flow" (OPF) problem is utilized to minimize a certain objective over certain power network variables under a set of given constraints. The "objective" may be the minimization of generation cost, or maximization of user utilities. The "variables" typically include real and reactive power outputs, bus voltages and voltage angles. The constraints may be bounds on voltages or power levels, or that the line loading not exceed thermal or stability limits. Due to the nonlinear nature of these variables and constraints, numerical methods are employed to obtain a solution that is within an acceptable tolerance.

Over the years, various algorithmic techniques have been examined to improve the operation speed of the numerical methods applied to the OPF analysis. Several constrained optimization techniques, such as Lagrange multiplier methods, penalty function methods and sequential quadratic programming, coupled with gradient methods and Newton methods for unconstrained optimization, emerged as the leading nonlinear programming (NLP) algorithms for solving AC OPFs. More recently, algorithms based on the primal-dual interior point method have gained popularity. See, for example, U.S. Pat. No. 6,775,597 entitled "Security Constrained Optimal Power Flow Method" issued to P. Ristanovic et al. on Aug. 10, 2004 and assigned to the assignee of this application.

Despite the advancements being made, a full utilization of OPF has not been widely adopted as part of a real-time analysis in large-scale power systems inasmuch as the number of constraints and variables is overwhelming. Instead, system operators often use simplified OPF tools that are based on linear programming (LP) and de-coupled (DC) system models. Historically, this limitation was based on the lack of powerful computer hardware and efficient AC OPF algorithms. With the advent of fast, low-cost computers, however, speed has now become a secondary concern, after algorithm robustness. The remaining prevalent argument for using LP-based DC OPF instead of NLP-based AC OPF is that LP algorithms are deterministic and always yield a solution (albeit not necessarily the desired solution), while NLP algorithms are less robust and often experience convergence problems.

A need remaining in the art, therefore, is for a technique that utilizes the preferred NLP algorithms while overcoming the problems associated with the time-consuming nature of these algorithms.

SUMMARY OF THE INVENTION

The needs remaining in the art are addressed by the present invention, which relates to solving the optimal power flow (OPF) problem for electrical generation and distribution systems and, more particularly, to a re-configuration of the OPF problem that allows for a simplified analysis and resolution of a network-based OPF problem in a minimal number of iterations.

In accordance with the present invention, it has been found that the standard mixed integer quadratic problem (MIQP) definition can be reconfigured, using the chain rule, to a relatively compact linear system of six equations with six unknowns (the smallest reducible (atomic) problem). Advantageously, the reduction in the complexity of the problem does not require any assumptions and yields a solution equivalent to the original problem.

In one embodiment, the present invention discloses an optimal power flow (OPF) method of operating a power system, comprising the steps of: a) determining power flows for a base case operation at least one contingency case operation of the power system, defined as a original discrete OPF problem; b) modifying the original discrete OPF problem to eliminate binary variables and introduce continuous relaxation of the discrete OPF problem; c) introducing slack variables to transform inequalities present in the original OPF problem, forming an "equality constrained" problem; d) applying an interior point method to solve the continuous relaxation; e) creating a reduced Newton system of equations defining the solution; f) applying a chain rule process to the reduced Newton system to create an irreducible set of linear equations defining the original OPF problem; and g) solving the irreducible set of linear equations and generating a solution to the original discrete OPF problem.

Other and further advantages and aspects of the present invention will become apparent during the course of the following discussion and by reference to the accompanying drawings.

BRIEF DESCRIPTION OF THE DRAWINGS

Referring now to the drawings

DETAILED DESCRIPTION

While the general subject of Optimal Power Flow (OPF) in relation to power system planning, operating and control has been the subject of study for decades, a continuing stumbling block has been the need to evaluate the solution as a mixed integer problem, requiring the use of different types of analyses at different times, including viewing the non-convex variables (such as "voltage law") as a quadratic. By virtue of performing a convexification on these variables in accordance with the present invention, it is now possible to reformulate the OPF problem with discrete parameters, opening up the possibility to utilize solution approaches heretofore unavailable.

As mentioned above, the base case OPF problem seeks to produce an optimum power flow solution that balances generation and consumption for all buses within a power distribution system—across all connected branches—such that the overall system state (as measured by the underlying physical parameters such as voltages and phase angles) is feasible and safe. The base case model utilizes the following set of parameters: (1) AC and DC energy dispatch control (i.e., bus generation flow, bus load flow, branch power flow); (2) AC bus voltage and phase angle regulation; (3) AC transformer and phasor tap and shunt switch selection; (4) AC/DC converter control.

Figure 1:
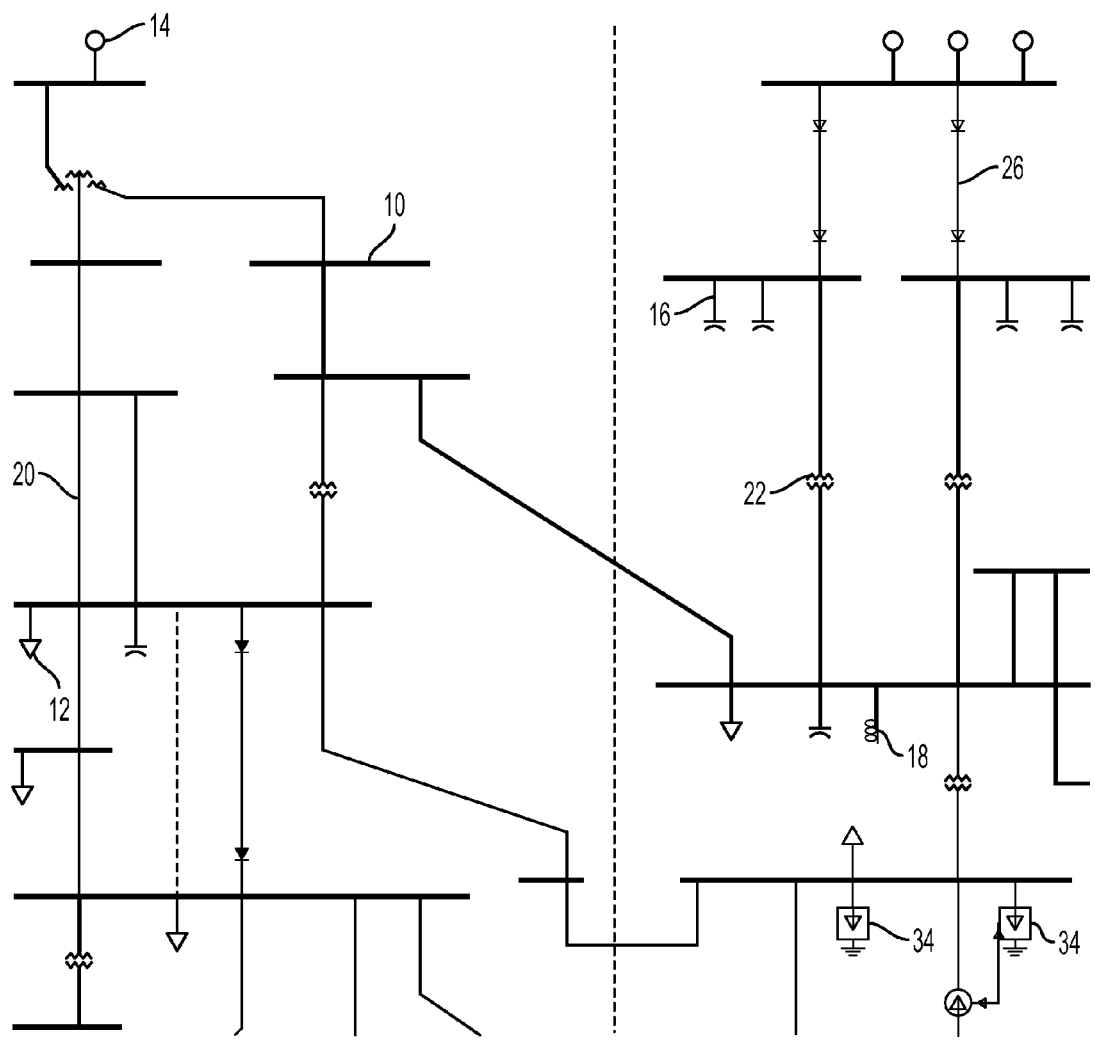
FIG. 1 is illustrative of an exemplary portion of an electric power grid that is to be monitored and controlled by an Optical Power Flow (OPF) analysis in accordance with the present invention.

In studying the electric power network, the following components and their control states are considered, where these components are shown in the network graph of FIG. 1. An AC bus 10 represents a node in the network graph, where the bus is defined by the following controls and states:
  Load 12: utilizes/consumes both active power (measured in MW) and reactive power (measured in MVar)
  Generator 14: creates/generates both active power (MW) and reactive power (MVar)
  Voltage and phase angle of bus 10: restricted to a certain range around a nominal value
  Shunt capacitor 16: (optional) can be fixed or "switched", has a positive value and moderates the active and reactive "net" power produced at the bus
  Shunt inductor 18: (also optional) can be fixed or "switched", has a negative value and moderates the active and reactive "net" power produced at the bus
In studying AC bus 10 in terms of developing an OPF solution, the main parameters of concern are the bounds for both load 12 and generator 14, as well as the bounds for the voltage and phase angle.

An AC branch (or line) 20, as shown in FIG. 1, represents an arc in the network graph and transmits both active and reactive power. AC branch 20 is best represented by the following controls and states:
  Power flow: defined as active and reactive power injected into branch 20 by both of its connected AC buses 10 (located above and below AC branch 20 on the network graph of FIG. 1)
  Adjusted impedance: (optional) and represents the branch impedance adjusted by an attached transformer 22
In studying AC branch 20 in terms of developing an OPF solution, the main parameters of concern are the admittance matrix (as discussed below and based on the branch impedance and branch fixed shut admittance) and the flow capacity ratings (that is, the minimum and maximum total flow as constrained by thermal ratings).

AC transformer 22 is an extra add-on to AC branch 20 that may either transform the voltages at the connected buses (traditional "transformer" mode), or shift the difference between the phase angles of the connected buses ("phasor" mode). AC transform 22 itself is modeled by the following controls and states:
  Tap choice
  Tap turns ratio (transformer mode)
  Tap phase shift (phasor mode)
DC bus 24 represents a node in the network graph and is represented by "DC voltage" and "current injection" controls, where the main parameters for DC bus 24 are the bounds for the voltage and current. DC branch (or line) 26 is represented as an arc in the network graph of FIG. 1 and transmits a constant current in the network. DC branch 26 is modeled by its DC current, where the main DC bus parameter is its resistance.

A converter is shown as an arc in the network graph of FIG. 1 and is used to connect AC and DC buses. Converters can be of two types: a rectifier 28 (AC to DC converter) and an inverter 30 (DC to AC converter). For the purposes of OPF, a converter is defined by the following controls and states:
  Firing and overlap angles, AC side voltage (a transformer being associated with a converter)
  Power factor, active power injection
The main converter parameters used in OPF analysis are: bounds for all converter controls and states, as well as the commutating impedance. A voltage source converter 32 is a special type of converter that does not involve firing/overlap angles and directly controls voltage, power factor and active power injection. FACTS (flexible AC transmission system) devices 34 are not modeled as distinct components for the OPF analysis, but rather as tight bounds on certain controls/states of other network components that are regulated by FACTS. Finally, the OPF is generally performed for an "area", which is defined as a grouping of buses used for defining area power exchange and inter-area power transfer constraints. An "area" generally involves several interfaces that correspond to a group of branches that connect one area to another.

With these definitions in place, the following description of the details of the present invention will be readily understood. During the course of the following discussion, an electrical network will be presumed that comprises rt buses and in branches, where a branch connecting node i to node j is denoted (i,j). A branch will also be denoted by its branch-ID, where the k-th branch is defined as $e_k$. If $e_k$ is the branch-ID of branch (i,j), then the branch (j,i) has branch-ID $e_{k+1}$. Branches are stored in increasing order of their branch-IDs. The set of all buses will be noted by N and the set of all branches by E.

As will be discussed in detail below, the methodology of the present invention is based upon the application of the chain rule in simplifying the original discrete OPF problem, while maintaining an equivalency with the original problem in a manner that the generated results are equivalent to those achieved by the longer and more laborious straightforward solution of the original problem. A flowchart outlining the steps of the method of the present invention is shown in FIG. 2.

Figure 2:
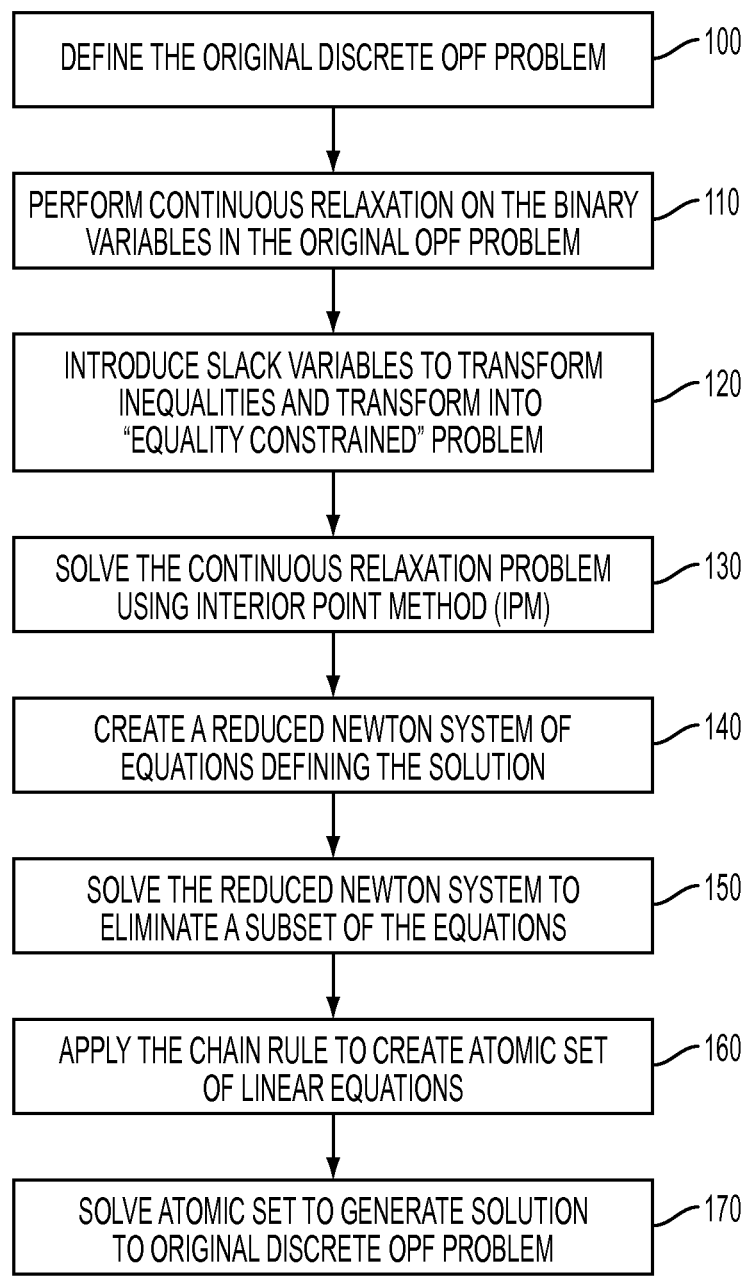
FIG. 2 contains a flowchart of the methodology of the present invention.

Referring to FIG. 2, the process begins with defining the original discrete OPF problem (step 100). The parameters in this problem will be a function of the actual network under study. Once the discrete OPF problem has been defined, the next step is to introduce the continuous relaxation of the discrete OPF (step 110) by modifying the binary variables to instead take on a value less than or equal to one. Slack variables are then introduced (step 120) to transform the inequalities present in the original OPF problem, forming an "equality constrained" problem. The interior point method (IPM) is then applied (step 130) to solve the continuous relaxation problem, using a defined barrier function and weighting variable. The utilization of the IPM yields a reduced Newton system of equations defining the solution (step 140), where these equations are solved to eliminate selected equations (step 150). The chain rule is then applied (step 160) to create an irreducible (i.e., atomic) set of linear equations defining the original OPF problem, where the final step in the process (step 170) is to solve this minimal set of linear equations and generate a solution to the original discrete OPF problem. The remainder of this specification describes the outlined process in detail.

As stated above, the intent of the problem being addressed is to define the minimal OPF, which may be defined in the following compact form:

$$\min$$
$$q(w) = \frac{1}{2}x^T Q_x x + c_x^T x + \frac{1}{2}t^T Q_t t + c_t^T t + \frac{1}{2}u_*^T Q_{u*} u_* +$$
$$c_{u*}^T u_* + \frac{1}{2}u_{}^T Q_{u} u_{} + c_{u}^T u_{**} + \frac{1}{2}u_0^T Q_{u0} u_0 + c_{u0}^T u_0$$

$$\min$$
$$q(w) = \frac{1}{2}x^T Q_x x + c_x^T x + \frac{1}{2}t^T Q_t t + c_t^T t +$$
$$\frac{1}{2}u_*^T Q_{u*} u_* + c_{u*}^T u_* + \frac{1}{2}u_{}^T Q_{u} u_{} + c_{u}^T u_{**} +$$
$$\frac{1}{2}u_0^T Q_{u0} u_0 + c_{u0}^T u_0$$

s.t. $x - At = 0$ $t - B_0 u_0 - B_* u_* - B_{} u_{} - H_0 z_0 = 0$ $N_{z*} z_* = 1$ $N_{z} z_{} - M_z z_* = 0$ $N_u u_{**} - M_u u_* = 0$ $0 \leq x \leq d_x$ $0 \leq t \leq d_t$ $\underline{D} u_* z_* \leq u_* z_* \leq \overline{D} u_* z_*$ $\underline{D} u_{} z_{} \leq u_{} z_{} \leq \overline{D} u_{} z_{}$ $0 \leq u_0 \leq d_{u0}$ $z_* \in \{0,1\}^{n_{x*}}$ $z_{} \in \{0,1\}^{n_{x}}$ The binary variables are defined as the z-dependent quantities and the remainder being continuous variables. While a number of these constraints are well-known and have been used previously to solve the OPF problem, the introduction of $z_*$ and $z_{**}$ are used in the following matrix operations to "test" local variables within the diagonal matrices $\underline{D}$ and $\overline{D}$. The vector x stores the bus-dependent variables, the vector t stores the branch-dependent variables and the vector u stores the bus and branch control variables. The matrix $\underline{D}$ is a one-dimensional array (vector) that stores the lower bounds of the variable x, t and u (in that order), and the matrix D is a one-dimensional array (vector) that stores the upper bounds of the same variables in the same order.

The constraint $x - At = 0$ represents the flow balance constraints for the electrical generation and distribution system, as defined by the following:

$$x_i = \sum_{j=1}^{n} R_{ij} t_{ij},$$

$$x_i = (P_i, Q_i), \text{ and}$$

$$t_{ij} = (P_{ij}, Q_{ij}),$$

where $R_{ij}$ represents the entries of the adjacency matrix, that is, $R_{ij} = 1$ if there is a branch from node i to node j, otherwise, $R_{ij} = 0$. As a result, the matrix A consists of 2×2 identity blocks.

For example, presume that a network has four buses: 1, 2, 3 and 4, with the following branches: $e_1 = (1,2)$, $e_2 = (2,1)$, $e_3 = (2,3)$, $e_4 = (3,2)$, $e_5 = (1,3)$, $e_6 = (3,1)$, $e_7 = (2,4)$, and $e_8 = (4,2)$. The adjacency matrix R then takes the following form:

$$R = \begin{bmatrix} 0 & I_2 & I_2 & 0 \\ I_2 & 0 & I_2 & I_2 \\ I_2 & I_2 & 0 & 0 \\ 0 & I_2 & 0 & 0 \end{bmatrix},$$

where $I_2$ is the 2×2 identity matrix. Furthermore, the constraints related to the first bus (that is, the first block of constraints of this type) have the form:

$P_1 = P_{1,2} + P_{1,3}$ $Q_1 = Q_{1,2} + Q_{1,3}$

The constraint $t - B_0 u_0 - B_* u_* - B_{} u_{} - H_0 z_0 = 0$ represents the discretized voltage law defined as follows:

$t_{ij} = R_{ij}(A_{ij} u_i + B_{ij} u_j + C_{ij} u_{ij} + D_{ij} u_{ij})$, for all branches $(i,j)$.

The continuous relaxation of this discrete OPF problem is then defined as follows:

$$\min$$
$$q(w) = \frac{1}{2}x^T Q_x x + c_x^T x + \frac{1}{2}t^T Q_t t + c_t^T t + \frac{1}{2}u_*^T Q_{u*} u_* +$$
$$c_{u*}^T u_* + \frac{1}{2}u_{}^T Q_{u} u_{} + c_{u}^T u_{**} + \frac{1}{2}u_0^T Q_{u0} u_0 + c_{u0}^T u_0$$

$$\min$$
$$q(w) = \frac{1}{2}x^T Q_x x + c_x^T x + \frac{1}{2}t^T Q_t t + c_t^T t +$$
$$\frac{1}{2}u_*^T Q_{u*} u_* + c_{u*}^T u_* + \frac{1}{2}u_{}^T Q_{u} u_{} + c_{u}^T u_{**} +$$
$$\frac{1}{2}u_0^T Q_{u0} u_0 + c_{u0}^T u_0$$

s.t. $x - At = 0$ $t - B_0 u_0 - B_* u_* - B_{} u_{} - H_0 z_0 = 0$ $N_{z*} z_* = 1$ $N_{z} z_{} - M_z z_* = 0$ $N_u u_{**} - M_u u_* = 0$ $x \le d_x$ $t \le d_t$ $-u_* - D_{u_*} z_* \le 0$ $u_* + D_{u_*} z_* \le 0$ $-u_{} - D_{u_{}} z_*^* \le 0$ $u_{} + D_{u_{}} z_*^* \le 0$ $u_0 \le d_{u_0}$ $0 \le z_* \le 1$ $0 \le z_{**} \le 1$

The matrix $N_{z*}$ models the "special order set" (SOS)-type 1 constraints and is of the following general form:

$$N_{Z*} = \begin{bmatrix} 1 & 1 & 1 & 0 & \cdots & \cdots & \cdots \\ 0 & 0 & 0 & \cdots & \cdots & \cdots & \cdots \\ \cdots & \cdots & \cdots & \cdots & \cdots & \cdots & \cdots \end{bmatrix}$$

Also, the constraint $N_{z}z_{} - M_z z_* = 0$ models constraints of the form:

$$\sum_{k_2 \in K_2} z_{k_1 k_2} - z_{k_1} = 0, \forall k_1 \in K_1$$

$$\sum_{k_1 \in K_1} z_{k_1 k_2} - z_{k_2} = 0, \forall k_2 \in K_2$$

for all different sets $K_1$ and $K_2$.

For example, if $K_1 = \{1, 2\}$ and $K_2 = \{3, 4, 5\}$, then the above constraints become:

$k_1 = 1$: $z_{13} + z_{14} + z_{15} + z_1 = 0$ $k_1 = 1$: $z_{23} + z_{24} + z_{25} + z_2 = 0$ $k_2 = 3$: $z_{13} + z_{23} - z_{23} = 0$ $k_2 = 4$: $z_{14} + z_{24} - z_4 = 0$ $k_2 = 5$: $z_{15} + z_{25} - z_5 = 0$.

The above two sets of equations for $K_1$ and $K_2$ can then be expressed in matrix/vector form as follows:

$$\begin{bmatrix} 1 & 1 & 1 & 0 & 0 & 0 \\ 0 & 0 & 0 & 1 & 1 & 1 \\ 1 & 0 & 0 & 1 & 0 & 0 \\ 0 & 1 & 0 & 0 & 1 & 0 \\ 0 & 0 & 1 & 0 & 0 & 1 \end{bmatrix} \begin{bmatrix} z_{12} \\ z_{13} \\ z_{14} \\ z_{22} \\ z_{23} \\ z_{24} \end{bmatrix} - \begin{bmatrix} z_1 \\ z_2 \\ z_3 \\ z_4 \\ z_5 \end{bmatrix} = 0.$$

In the general case, the matrix $N_{z**}$ is a block diagonal matrix whose blocks have the structure of the above coefficient matrix.

In the case where there are six sets $K_1, K_2, K_3, K_4, K_5$ and $K_6$, the overall matrix N will have a structure similar to the one shown below:

$$N_{Z**} = \begin{bmatrix} N_{12} & & \\ & N_{34} & \\ & & N_{56} \end{bmatrix}.$$

It is to be understood that the constraints $N_{u}u_{} - M_u u_* = 0$ are derived in similar fashion, and the matrix $N_{u}$ has the same structure as the matrix $N_{z}$.

By adding slack variables to the above inequality constraints, as is done in accordance with the primal-dual method, the following problem is obtained:

min $$q(w) = \frac{1}{2}x^T Q_x x + c_x^T x + \frac{1}{2} t^T Q_t t + c_t^T t + \frac{1}{2} u_*^T Q_{u*} u_* + $$
$$c_{u*}^T u_* + \frac{1}{2} u_{}^T Q_{u} u_{} + c_{u}^T u_{**} + \frac{1}{2} u_0^T Q_{u0} u_0 + c_{u0}^T u_0$$

min $q(w) = \frac{1}{2} x^T Q_x x + c_x^T x + \frac{1}{2} t^T Q_t t + c_t^T t +$ $\frac{1}{2} u_*^T Q_{u*} u_* + c_{u*}^T u_* + \frac{1}{2} u_{}^T Q_{u} u_{} + c_{u}^T u_{**} +$ $\frac{1}{2} u_0^T Q_{u0} u_0 + c_{u0}^T u_0$ s.t. $x - At = 0$ $t - B_0 u_0 - B_* u_* - B_{} u_{} - H_0 z_0 = 0$ $N_{z*} z_* = 1$ $N_{z} z_{} - M_z z_* = 0$ $N_{u} u_{} - M_u u_* = 0$ $x + s_x - d_x = 0$ $t + s_t - d_t = 0$ $-u_* - \underline{D}_{u*} z_* + \underline{s}_{u_*} = 0$ $u_* - \overline{D}_{u*} z_* + \overline{s}_{u_*} = 0$ $-u_{} - \underline{D}_{u} z_{} + \underline{s}_{u_{}} = 0$ $u_{} - \overline{D}_{u} z_{} + \overline{s}_{u_{}} = 0$ $z_* + s_{z*} - 1 = 0$, and $z_{} + s_{z} - 1 = 0$, where $x, t, u_*, u_{**}, u_0, z_*, z_{**}, s_x, s_t, s_{u*}, s_{u**}, s_{u0}, s_{z*}, s_{z**} \ge 0$.

It is to be noted that equality-constrained optimization problems, of the type shown above, are known to be easier to solve than problems involving inequalities. For the sake of convenience, the above-defined slack variables will simply be denoted as s. In accordance with the present invention, the above-cited continuous relaxation is solved using an interior point method, with the barrier function defined as:
$\Phi(w, s, \mu) = q(w) - \phi(w, s; \mu)$, where $\mu$ controls the weight on the satisfaction of the constraint, and $$\phi(w, s; \mu) = \mu \left[ \sum_{i=1}^{n_x} \log(x_i) + \sum_{i=1}^{n_t} \log(t_i) + \sum_{i=1}^{n_{u_*}} \log(u_{*_i}) + \right.$$

$$\sum_{i=1}^{n_{u_{}}} \log(u_{_i}) + \sum_{i=1}^{n_x} \log(x_i) + \sum_{i=1}^{n_{z_*}} \log(z_{*_i}) + \sum_{i=1}^{n_{z_{}}} \log(z_{_i}) \bigg] +$$

$$\mu \left[ \sum_{i=1}^{n_x} \log(s_{x_i}) + \sum_{i=1}^{n_t} \log(s_{t_i}) + \sum_{i=1}^{n_{u_*}} \log(s_{u_{*_i}}) + \sum_{i=1}^{n_{u_{}}} \log(s_{u_{_i}}) + \right.$$

$$\sum_{i=1}^{n_{u0}} \log(s_{u_{0i}}) + \sum_{i=1}^{n_{z_*}} \log(s_{z_{*_i}}) + \sum_{i=1}^{n_{z_{}}} \log(s_{z_{_i}}) \bigg]$$

The barrier problem is then defined as minimizing $\Phi(w, s; \mu)$ with the same constraints on the variables as defined above, and is shown as follows:

$\min \Phi(w, s; \mu)$ s.t. $x - At = 0$ $t - B_0 u_0 - B_* U_* - B_{} u_{} - H_0 z_0 = 0$ $N_{z_*} z_* = 1$ $N_{z_{}} z_{} - M_z z_* = 0$ $N_u u_{**} - M_u u_* = 0$ $x + s_x - d_x = 0$ $t + s_t - d_t = 0$ $-u_* - \underline{D}_{u_*} z_* + \underline{s}_{u_8} = 0$ $u_* + \overline{D}_{u_*} z_* + \overline{s}_{u_8} = 0$ $-u_{} - \underline{D}_{u_{}} z_{} + \underline{s}_{u_{}} = 0$ $u_{} + \overline{D}_{u_{}} z_{} + \overline{s}_{u_{}} = 0$ $u_0 + s_{u_0} - d_{u_0} = 0$ $z_8 + s_{z_*} - 1 = 0$, and $z_{} + s_{z_{}} - 1 = 0$.

The Lagrangian function of the barrier problem is then defined as follows:

$L_\phi(w, s, y) = \phi(w, s; \mu) - y_A^T(x - At) - y_B^T(t - B_0 u_0 - B_* u_* - B_{} u_{} - H_0 z_0) - y_{N_{z_*}}^T(N_{z_*} z_* - 1) - y_{n_{z_{}}}^T(N_{z_{}} z_{**} - M_z z_*) - (y_{N_{u_{}}}^T(N_u u_{} - M_u u_*)) + y_x^T(x + s_x - d_x) + y_t^T(t + s_t - d_t) + y_{D_{u_*}}^T(-u_* - \underline{D}_{u_*} z_* + \underline{s}_{u_8}) + y_{D_{u_*}}^T(u_* + \overline{D}_{u_*} z_* + \overline{s}_{u_8}) + y_{D_{u_{}}}^T(-u_{} - \underline{D}_{u_{}} z_{} + \underline{s}_{u_{}}) + y_{D_{u_{}}}^T(u_{} + \overline{D}_{u_{}} z_{} + \overline{s}_{u_{}}) + y_{u_0}^T(u_0 + s_{u_0} - d_{u_0}) + y_{z_*}^T(z_* + s_{z_*} - 1) + y_{z_{}}^T(z_{} + s_{z_{**}} - 1).$ The optimality conditions (i.e., Karush-Kuhn-Tucker conditions) of the barrier problem are then defined as follows:

$Q_x x + c_x - \mu X^{-1} e - y_A + y_x = 0$ $Q_t t + c_t - \mu T^{-1} e + A^T y_A - y_B + y_t = 0$ $Q_{u_*} u_* + c_{u_*} - \mu U^{-1} {} e + B_{}^T y_B + M_u y_{N_{u_{**}}} - y_{D_{u_*}} + y_{D_{u_*}} = 0$ $Q_{u_{}} u_{} + c_{u_{}} - \mu U^{-1} {} e + B_{}^T y_B + N_{u_{}}^T y_{N_{u_{}}} - y_{D_{u_{}}} + y_{D_{u_{**}}} = 0$ $Q_{u_0} u_0 + c_{u_0} - \mu U_0^{-1} e + B_0^T y_B + y_{u_0} = 0$ $-\mu Z_*^{-1} e - N_{z_*}^T y_{N_{u_{}}} + M_z y_{N_{z_{}}} - \underline{D}_{u_*} y_{D_{u_*}} + \underline{D}_{u_*} y_{D_{u_*}} + y_{z_*} = 0$ $-\mu Z_{}^{-1} e - N_{z_{}}^T y_{N_{u_{}}} - \underline{D}_{u_{}} y_{D_{u_{}}} + \underline{D}_{u_{}} y_{D_{u_{}}} y_{z_{}} = 0$

--- - ---

$-\mu S_x^{-1} e + y_x = 0$ $-\mu S_t^{-1} e + y_t = 0$ $-\mu S_{u_*}^{-1} e + y_{D_{u_*}} = 0$ $-\mu S_{u_*}^{-1} e + y_{D_{u_*}} = 0$ $S_{u_{}}^{-1} e + y_{D_{u_{}}} = 0$ $-\mu S_{u_{}}^{-1} e + y_{D_{u_{}}} = 0$ $-\mu S_{z_*}^{-1} e + y_{z_*} = 0$ $-\mu S_{Z_{}}^{-1} e + y_{z_{}} = 0$

---- - -

$x - At = 0$ $t - B_0 u_0 - B_* u_* - B_{*8} u_{**} - H_0 z_0 = 0$ $n_{z_*} z_* - 1 = 0$ $N_{z_{}} z_{} - M_z z_* = 0$ $N_u u_{**} - M_u u_* = 0$

---- - -

$x + s_x - d_x = 0$ $t + s_t - d_t = 0$ $-u_* - D_{u_*} z_* + s_{u_8} = 0$ $u_* - D_{u_*} z_* + s_{u_8} = 0$ $-u_{} - D_{u_{}} z_{} + s_{u_{}} = 0$ $u_{} + D_{u_{}} z_{} + s_{u_{}} = 0$ $U_0 + s_{u_0} - d_{u_0} = 0$ $z_* + s_{z_*} - 1 = 0$ $z_{} + s_{z_{}} - 1 = 0$

Now introducing the following auxiliary variables:

$$z_x = \mu X^{-1} e$$

$$z_t = \mu T^{-1} e$$

$$z_{u_*} = \mu U_*^{-1} e$$

$$z_{u_{}} = \mu U_{}^{-1} e$$

$$z_{u_0} = \mu U_0^{-1} e$$

$$z_{z_*} = \mu Z_*^{-} e$$

$$z_{z_{}} = \mu Z_{}^{-} e$$

$$z_{sx} = \mu S_x^{-1} e$$

$$z_{st} = \mu S_t^{-1} e$$

$$z_{sz_*} = \mu S_{z_*}^{-1} e$$

$$z_{sz_{}} = \mu S_{z_{}}^{-1} e,$$

the perturbed optimality conditions are obtained (where $\mu e$ is the introduced perturbation):

$$Q_x x + c_x - z_x - y_A + y_x = 0$$

$$Q_t t + c_t - z_t + A^T y_A - y_B + y_t = 0$$

$$Q_{u_*} u_* + c_{u_*} - z_{u_*} + B_*^T y_B + M_u^T y_{N_{u_{**}}} - y_{Du_*} + y_{\underline{Du_*}} = 0$$

$$Q_{u_{}} u_{} + c_{u_{}} - z_{u_{}} + B_{}^T y_B + N_{u_{}}^T y_{N_{u_{}}} - y_{Du_{}} + y_{\underline{Du_{**}}} = 0$$

$$Q_{u_0} u_0 + c_{u_0} - z_{u_0} + B_0^T y_B + y_{u_0} = 0$$

$$-z_{z_*} - N_{z_*}^T y_{N_{u_{}}} + M_z y_{N_{z_{}}} - \underline{D_{u_*}} y_{Du_*} + \underline{D_{u_*}} y_{\underline{Du_*}} + y_{z_*} = 0$$

$$-z_{z_{}} - N_{z_{}}^T y_{n_{u_{}}} - \underline{D_{u_{}}} y_{Du_{}} + \underline{D_{u_{}}} y_{\underline{Du_{}}} + y_{z_{}} = 0$$

---

$$-z_{sx} + y_x = 0$$

$$-z_{st} + y_t = 0$$

$$-z_{su_*} + y_{Du_*} = 0$$

$$-z_{\underline{su_*}} + y_{\underline{Du_*}} = 0$$

$$-z_{su_{}} + y_{Du_{}} = 0$$

$$-z_{\underline{su_{}}} + y_{\underline{Du_{}}} = 0$$

$$-z_{su_0} + y_{u_0} = 0$$

$$-z_{sz_*} + y_{z_*} = 0$$

$$-z_{sz_{}} + y_{z_{}} = 0$$

---

$$x - At = 0$$

$$t - B_0 u_0 - B_8 u_* - B_{} u_{} - H_0 z_0 = 0$$

$$N_z z_* - 1 = 0$$

$$N_{z_{}} z_{} - M_z z_* = 0$$

$$N_u u_{**} - M_u u_* = 0$$

---

$$x + s_x - d_x = 0$$

$$t + s_t - d_t = 0$$

$$-u_* - D_{u_*} z_* + s_{\underline{u_8}} = 0$$

$$u_* - D_{u_*} z_* + s_{u_8} = 0$$

$$-u_{} - D_{u_{}} z_{} + s_{\underline{u_{}}} = 0$$

$$u_{} - D_{u_{}} z_{} + s_{u_{}} = 0$$

$$u_0 + s_{u_0} - d_{u_0} = 0$$

$$z_* + s_{z_*} - 1 = 0$$

$$z_{} + s_{z_{}} - 1 = 0$$

---

$$XZ_x - \mu e = 0$$

$$TZ_t - \mu e = 0$$

$$U_* Z_{u_*} - \mu e = 0$$

$$U_{} Z_{u_{}} - \mu e = 0$$

$$U_0 Z_{u_0} - \mu e = 0$$

$$Z_*^{-1} Z_{z_*} - \mu e = 0$$

$$Z_{}^{-1} Z_{z_{}} - \mu e = 0$$

$$S_x Z_{Sx} - \mu e = 0$$

$$S_t Z_{St} - \mu e = 0$$

$$S_{u_*} Z_{u_*} - \mu e = 0$$

$$S_{\underline{u_*}} Z_{u_*} - \mu e = 0$$

$$S_{u_{}} Z_{u_{}} - \mu e = 0$$

$$S_{\underline{u_{}}} Z_{u_{}} - \mu e = 0$$

$$S_{u_0} Z_{u_0} - \mu e = 0$$

$$S_{z_*} Z_{sz_*} - \mu e = 0$$

$$S_{z_*} Z_{sz_*} - \mu e = 0$$

An important aspect of the present invention is the ability to utilize a Newton system to define the variables in compact form, where $$\begin{bmatrix} Q & \hat{J} & -I \\ J & 0 & 0 \\ Z & 0 & P \end{bmatrix} \begin{bmatrix} \Delta P \\ \Delta Y \\ \Delta Z \end{bmatrix} = \begin{bmatrix} r_P \\ r_Y \\ r_Z \end{bmatrix},$$

and $$\Delta P = (\Delta x, \Delta t, \Delta u_*, \Delta u_{**}, \Delta u_0, \Delta z_*, \Delta z_{**}, \Delta s_x, \Delta s_t, \Delta \underline{s_{u_*}}, \Delta s_{u_{}}, \Delta \underline{s_{}}, \Delta \underline{s_{u_{}}}, \Delta \underline{s_{}}, \Delta s_{z_{**}})^T$$

$$\Delta Y = (\Delta y_A, \Delta y_B, \Delta y_{N_{z_{**}}}, \Delta y_{N_{z_*}}, \Delta y_{N_{u_{**}}}, \Delta y_x, \Delta y_t, \Delta y_{\underline{Du_*}}, \Delta y_{\overline{Du_*}}, \Delta y_{Du_{}}, \Delta y_{\overline{Du_{}}}, \Delta y_{u_0}, \Delta y_{z_*}, \Delta y_{z_{**}})^T$$

$$\Delta Z = (\Delta z_x, \Delta z_t, \Delta z_{u_*}, \Delta z_{u_{**}}, \Delta z_{u_0}, \Delta z_{z_*}, \Delta z_{z_{**}}, \Delta z_{sx}, \Delta z_{st}, \Delta z_{\underline{su_*}} \Delta z_{sux}, \Delta z_{\underline{su_{}}}, \Delta z_{su_{}}, \Delta z_{su_0}, \Delta z_{sz_*}, \Delta z_{sz_*})^T,$$

$$Q = \begin{bmatrix} Q_x & 0 & 0 & 0 & 0 & 0 & 0 & 0 & 0 & 0 & 0 & 0 & 0 & 0 \\ 0 & Q_t & 0 & 0 & 0 & 0 & 0 & 0 & 0 & 0 & 0 & 0 & 0 & 0 \\ 0 & 0 & Q_{u_*} & 0 & 0 & 0 & 0 & 0 & 0 & 0 & 0 & 0 & 0 & 0 \\ 0 & 0 & 0 & Q_{u_{**}} & 0 & 0 & 0 & 0 & 0 & 0 & 0 & 0 & 0 & 0 \\ 0 & 0 & 0 & 0 & Q_{u_0} & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 \end{bmatrix}$$

$$J = \begin{bmatrix} I & -A & 0 & 0 & 0 & 0 & 0 & 0 & 0 & 0 & 0 & 0 & 0 & 0 \\ 0 & I & -B_* & -B_{**} & -B_0 & 0 & 0 & 0 & 0 & 0 & 0 & 0 & 0 & 0 \\ 0 & 0 & 0 & 0 & 0 & N_{z_*} & 0 & 0 & 0 & 0 & 0 & 0 & 0 & 0 \\ 0 & 0 & 0 & 0 & 0 & -M_z & N_{z_{}} & 0 & 0 & 0 & 0 & 0 & 0 & 0 \\ 0 & 0 & -M_u & N_{u_{}} & 0 & 0 & 0 & 0 & 0 & 0 & 0 & 0 & 0 & 0 \\ I & 0 & 0 & 0 & 0 & 0 & 0 & I & 0 & 0 & 0 & 0 & 0 & 0 \\ 0 & I & 0 & 0 & 0 & 0 & 0 & 0 & I & 0 & 0 & 0 & 0 & 0 \\ 0 & 0 & -I & 0 & 0 & -\underline{D}_{u_*} & 0 & 0 & 0 & I & 0 & 0 & 0 & 0 \\ 0 & 0 & I & 0 & 0 & \overline{D}_{u_*} & 0 & 0 & 0 & 0 & I & 0 & 0 & 0 \\ 0 & 0 & 0 & -I & 0 & 0 & -\underline{D}_{u_{}} & 0 & 0 & 0 & 0 & I & 0 & 0 \\ 0 & 0 & 0 & I & 0 & 0 & \overline{D}_{u_{}} & 0 & 0 & 0 & 0 & 0 & I & 0 \\ 0 & 0 & 0 & 0 & I & 0 & 0 & 0 & 0 & 0 & 0 & 0 & I & 0 \\ 0 & 0 & 0 & 0 & 0 & I & 0 & 0 & 0 & 0 & 0 & 0 & 0 & I \\ 0 & 0 & 0 & 0 & 0 & 0 & I & 0 & 0 & 0 & 0 & 0 & 0 & I \end{bmatrix}$$

$$\hat{J} = \begin{bmatrix} -I & 0 & 0 & 0 & 0 & I & 0 & 0 & 0 & 0 & 0 & 0 & 0 & 0 \\ A^T & -I & 0 & 0 & 0 & 0 & I & 0 & 0 & 0 & 0 & 0 & 0 & 0 \\ 0 & B_*^T & 0 & 0 & M_u & 0 & 0 & -I & I & 0 & 0 & 0 & 0 & 0 \\ 0 & B_{}^T & 0 & 0 & -N_{u_{}} & 0 & 0 & 0 & 0 & -I & I & 0 & 0 & 0 \\ 0 & B_0^T & 0 & 0 & 0 & 0 & 0 & 0 & 0 & 0 & 0 & I & 0 & 0 \\ 0 & 0 & -N_{z_*} & M_z & 0 & 0 & 0 & \underline{D}_{u_*} & -\overline{D}_{u_*} & 0 & 0 & 0 & I & 0 \\ 0 & 0 & 0 & -N_{z_{}} & 0 & 0 & 0 & 0 & 0 & \underline{D}_{u_{}} & -\overline{D}_{u_{**}} & 0 & 0 & I \\ 0 & 0 & 0 & 0 & 0 & I & 0 & 0 & 0 & 0 & 0 & 0 & 0 & 0 \\ 0 & 0 & 0 & 0 & 0 & 0 & I & 0 & 0 & 0 & 0 & 0 & 0 & 0 \\ 0 & 0 & 0 & 0 & 0 & 0 & 0 & I & 0 & 0 & 0 & 0 & 0 & 0 \\ 0 & 0 & 0 & 0 & 0 & 0 & 0 & 0 & I & 0 & 0 & 0 & 0 & 0 \\ 0 & 0 & 0 & 0 & 0 & 0 & 0 & 0 & 0 & I & 0 & 0 & 0 & 0 \\ 0 & 0 & 0 & 0 & 0 & 0 & 0 & 0 & 0 & 0 & I & 0 & 0 & 0 \\ 0 & 0 & 0 & 0 & 0 & 0 & 0 & 0 & 0 & 0 & 0 & I & 0 & 0 \\ 0 & 0 & 0 & 0 & 0 & 0 & 0 & 0 & 0 & 0 & 0 & 0 & I & 0 \\ 0 & 0 & 0 & 0 & 0 & 0 & 0 & 0 & 0 & 0 & 0 & 0 & 0 & I \end{bmatrix}$$

$Z=\text{diag}\{z_x,Z_t,Z_{u*},Z_{u**},Z_{u0},Z_{z*},Z_{z**},Z_{sx},Z_{st},Z_{su*},Z_{su**},$
$\quad Z_{su0},Z_{sz*},Z_{sz**}\}$ $P=\text{diag}\{X,T,U_*,U_{**},U_0,Z_*,Z_{**},S_x,S_t,S_{u*},S_{u**},S_{u0},S_{z*},$
$\quad S_{z**}\}$ $r_p=(r_1,r_2,r_3,r_4,r_5,r_6,r_7,r_8,r_9,r_{10},r_{11},r_{12},r_{13},r_{14},r_{15},r_{16})^T$ $r_y=(r_{17},r_{18},r_{19},r_{20},r_{21},r_{22},r_{23},r_{24},r_{25},r_{26},r_{27},r_{28},r_{29},r_{30})^T$ $r_z=(r_{31},r_{32},r_{33},r_{34},r_{35},r_{36},r_{37},r_{38},r_{39},r_{40},r_{41},r_{42},r_{43},r_{44},$
$\quad r_{45},r_{46})^T$ The matrix $D_u$ is a diagonal matrix of the form: $D_u = \text{diag}\{d_{u1}, \ldots, d_{un}\}$, recalling that $d_{ui}$ is the upper bound of the variable $u_i$.

By solving for $\Delta Z$ at the third block of the Newton system, the following is obtained:

$\Delta z_x = X^{-1}Z_x\Delta x - z_x + \mu X^{-1}e$ $\Delta z_t = T^{-1}Z_t\Delta t - z_t + \mu T^{-1}e$ $\Delta z_{u*} = U_*^{-1}Z_{u*}\Delta u_* - z_{u*} + \mu U_*^{-1}e$ $\Delta z_{u} = U_{}^{-1}Z_{u}\Delta u_{} - z_{u} + \mu U_{}^{-1}e$ $\Delta z_{u0} = U_0^{-1}Z_{u0}\Delta u_0 - z_{u0} + \mu U_0^{-1}e$ $\Delta z_{z*} = U_*^{-1}Z_{z*}\Delta z_* - z_{z*} + \mu Z_*^{-1}e$ $\Delta z_{z} = U_{}^{-1}Z_{z}\Delta z_{} - z_{z} + \mu Z_{}^{-1}e$ $\Delta z_{sx} = S_x^{-1}Z_{sx}\Delta s_x - z_{sx} + \mu S_x^{-1}e$ $\Delta z_{st} = S_t^{-1}Z_{st}\Delta s_t - z_{st} + \mu S_t^{-1}e$ $\Delta z_{su*} = S_{u*}^{-1}Z_{su*}\Delta s_{u*} - z_{su*} + \mu S_{u0}^{-1}e$ $\Delta z_{su} = S_{*}^{-1}Z_{su*}\Delta s_{u} - z_{su} + \mu S_{u**}^{-1}e$ $\Delta z_{su0} = S_{u0}^{-1}Z_{su0}\Delta s_{u0} - z_{su0} + \mu S_{u0}^{-1}e$ $\Delta z_{sz*} = S_{z*}^{-1}Z_{sz*}\Delta s_{z*} - z_{sz*} + \mu S_{z*}^{-1}e$ $\Delta z_{sz} = S_{z}^{-1}Z_{sz}\Delta s_{z} - z_{sz} + \mu S_{z}^{-1}e$ Substituting the above equations in the <1,3> block of the above compact system, the reduced Newton system is obtained in the following form:

$$\begin{bmatrix} \hat{Q} & \hat{J} \\ J & 0 \end{bmatrix}\begin{bmatrix} \Delta P \\ \Delta Y \end{bmatrix} = \begin{bmatrix} \hat{r}_p \\ r_y \end{bmatrix},$$

where the matrix $\hat{Q}$ is defined as follows:

$$\hat{Q} = \text{diag}\left\{\begin{array}{l} Q_x + X^{-1}Z_x, Q_t + T^{-1}Z_t, Q_{u*} + U_*^{-1}Z_*, Q_{u} + U_{}^{-1}Z_{**}, Q_{u0} + \\ U_0^{-1}Z_{u0} + Z_*^{-1}Z_{z*}, Z_{}^{-1}Z_{z}, S_x^{-1}Z_{sx}, S_t^{-1}Z_{st}, S_{u*}^{-1}Z_{su*}, S_{su}^{-1}Z_{su}, \\ S_{u0}^{-1}Z_{su0}, S_{z*}^{-1}Z_{sz*}, S_{z}^{-1}Z_{sz} \end{array}\right\}$$

Then, solving for the various slack variables, the following is found:

$\Delta s_x = -S_t Z_{sx}^{-1}\Delta y_x - S_x Z_{sx}^{-1}\hat{r}_6$ $\Delta s_t = -S_t Z_{st}^{-1}\Delta y_t - S_t Z_{st}^{-1}\hat{r}_7$ $\Delta s_{u*} = -S_{u*}Z_{su*}^{-1}\Delta y_{u*} - S_{u*}Z_{su*}^{-1}\hat{r}_8$ $\Delta s_{u} = -S_{u}Z_{su}^{-1}\Delta y_{u} - S_{u}Z_{su}^{-1}\hat{r}_8$ $\Delta s_{u0} = -S_{u0}Z_{su0}^{-1}\Delta y_{u0} - S_{u0}Z_{su0}^{-1}\hat{r}_9$ $\Delta s_{z*} = -S_{z*}Z_{sz*}^{-1}\Delta y_{z*} - S_{z*}Z_{sz*}^{-1}\hat{r}_{10}$ $\Delta s_{z} = -S_{z}Z_{sz}^{-1}\Delta y_{z} - S_{z}Z_{sz}^{-1}\hat{r}_{10}$ which then allows for the above Newton system to be further simplified:

| | | | | | | | | | | | | | | | | | | | | | | |
|---|---|---|---|---|---|---|---|---|---|---|---|---|---|---|---|---|---|---|---|---|---|---|
| $\hat{Q}_{xi}$ | | | | | | | | $-1$ | $0$ | $0$ | $0$ | $0$ | $1$ | $0$ | $0$ | $0$ | $0$ | $0$ | $0$ | $0$ | $0$ | $0$ |
| | $\hat{Q}_t$ | | | | | | | $A^T$ | $-1$ | $0$ | $0$ | $0$ | $0$ | $1$ | $0$ | $0$ | $0$ | $0$ | $0$ | $0$ | $0$ | $0$ |
| | | $\hat{Q}_{u*}$ | | | | | | $0$ | $B_*^T$ | $0$ | $0$ | $M_u$ | $0$ | $0$ | $-1$ | $1$ | $0$ | $0$ | $0$ | $0$ | $0$ | $0$ |
| | | | $\hat{Q}_{u}$ | | | | | $0$ | $B_{}^T$ | $0$ | $0$ | $-N_{u**}^T$ | $0$ | $0$ | $0$ | $0$ | $-1$ | $1$ | $0$ | $0$ | $0$ | $0$ |
| | | | | $\hat{Q}_{u0}$ | | | | $0$ | $B_0^T$ | $0$ | $0$ | $0$ | $0$ | $0$ | $0$ | $0$ | $0$ | $0$ | $1$ | $0$ | $0$ | $0$ |
| | | | | | $D_{z*}$ | | | $0$ | $0$ | $-N_{z*}^T$ | $M_z$ | $0$ | $0$ | $0$ | $\underline{D}_{u*}$ | $-\overline{D}_{u*}$ | $0$ | $0$ | $0$ | $1$ | $0$ | |
| | | | | | | $D_{z**}$ | | $0$ | $0$ | $0$ | $-N_{z**}^T$ | $0$ | $0$ | $0$ | $0$ | $0$ | $\underline{D}_{u**}$ | $\overline{D}_{u**}$ | $0$ | $0$ | $1$ | |
| $1$ | $-A$ | $0$ | $0$ | $0$ | $0$ | $0$ | | $0$ | $0$ | $0$ | $0$ | $0$ | $0$ | $0$ | $0$ | $0$ | $0$ | $0$ | $0$ | $0$ | $0$ | $0$ |
| $0$ | $1$ | $-B_*$ | $-B_{**}$ | $-B_0$ | $0$ | $0$ | | $0$ | $0$ | $0$ | $0$ | $0$ | $0$ | $0$ | $0$ | $0$ | $0$ | $0$ | $0$ | $0$ | $0$ | $0$ |
| $0$ | $0$ | $0$ | $0$ | $0$ | $N_{z*}$ | $0$ | | $0$ | $0$ | $0$ | $0$ | $0$ | $0$ | $0$ | $0$ | $0$ | $0$ | $0$ | $0$ | $0$ | $0$ | $0$ |
| $0$ | $0$ | $0$ | $0$ | $0$ | $-M_z$ | $N_{z**}$ | | $0$ | $0$ | $0$ | $0$ | $0$ | $0$ | $0$ | $0$ | $0$ | $0$ | $0$ | $0$ | $0$ | $0$ | $0$ |
| $0$ | $0$ | $-M_u$ | $N_{u**}$ | $0$ | $0$ | $0$ | | $0$ | $0$ | $0$ | $0$ | $0$ | $0$ | $0$ | $0$ | $0$ | $0$ | $0$ | $0$ | $0$ | $0$ | $0$ |
| $1$ | $0$ | $0$ | $0$ | $0$ | $0$ | $0$ | | $0$ | $0$ | $0$ | $0$ | $0$ | $D_1$ | $0$ | $0$ | $0$ | $0$ | $0$ | $0$ | $0$ | $0$ | $0$ |
| $0$ | $1$ | $0$ | $0$ | $0$ | $0$ | $0$ | | $0$ | $0$ | $0$ | $0$ | $0$ | $0$ | $D_2$ | $0$ | $0$ | $0$ | $0$ | $0$ | $0$ | $0$ | $0$ |
| $0$ | $0$ | $-1$ | $0$ | $0$ | $-\underline{D}_{u*}$ | $0$ | | $0$ | $0$ | $0$ | $0$ | $0$ | $0$ | $0$ | $D_3$ | $0$ | $0$ | $0$ | $0$ | $0$ | $0$ | $0$ |
| $0$ | $0$ | $1$ | $0$ | $0$ | $\overline{D}_{u*}$ | $0$ | | $0$ | $0$ | $0$ | $0$ | $0$ | $0$ | $0$ | $0$ | $D_4$ | $0$ | $0$ | $0$ | $0$ | $0$ | $0$ |
| $0$ | $0$ | $0$ | $-1$ | $0$ | $0$ | $-\underline{D}_{u**}$ | | $0$ | $0$ | $0$ | $0$ | $0$ | $0$ | $0$ | $0$ | $0$ | $D_5$ | $0$ | $0$ | $0$ | $0$ | $0$ |
| $0$ | $0$ | $0$ | $1$ | $0$ | $0$ | $\overline{D}_{u**}$ | | $0$ | $0$ | $0$ | $0$ | $0$ | $0$ | $0$ | $0$ | $0$ | $0$ | $D_6$ | $0$ | $0$ | $0$ | $0$ |
| $0$ | $0$ | $0$ | $0$ | $1$ | $0$ | $0$ | | $0$ | $0$ | $0$ | $0$ | $0$ | $0$ | $0$ | $0$ | $0$ | $0$ | $0$ | $D_7$ | $0$ | $0$ | $0$ |
| $0$ | $0$ | $0$ | $0$ | $0$ | $1$ | $0$ | | $0$ | $0$ | $0$ | $0$ | $0$ | $0$ | $0$ | $0$ | $0$ | $0$ | $0$ | $0$ | $D_8$ | $0$ | $0$ |
| $0$ | $0$ | $0$ | $0$ | $0$ | $0$ | $1$ | | $0$ | $0$ | $0$ | $0$ | $0$ | $0$ | $0$ | $0$ | $0$ | $0$ | $0$ | $0$ | $0$ | $D_9$ | $0$ |

$$\begin{bmatrix} \Delta x \\ \Delta t \\ \Delta u_* \\ \Delta u_{**} \\ \Delta u_0 \\ \Delta z_* \\ \Delta z_{**} \\ \Delta y_A \\ \Delta y_B \\ \Delta y_{N_{z_*}} \\ \Delta y_{N_{z_{**}}} \end{bmatrix} = - \begin{bmatrix} \hat{r}_1 \\ \hat{r}_2 \\ \hat{r}_3 \\ \hat{r}_4 \\ \hat{r}_5 \\ \hat{r}_6 \\ \hat{r}_7 \\ \hat{r}_8 \\ \hat{r}_9 \\ \hat{r}_{10} \\ \hat{r}_{11} \end{bmatrix}$$

$$\begin{bmatrix} \Delta y_{N_{u_{**}}} \\ \Delta y_x \\ \Delta y_t \\ \Delta y_{D_{u_*}} \\ \Delta y_{\overline{D}_{u_*}} \\ \Delta y_{D_{u_{}}} \\ \Delta y_{\overline{D}_{u_{}}} \\ \Delta y_{u_0} \\ \Delta y_{z_*} \\ \Delta y_{z_{**}} \end{bmatrix} \begin{bmatrix} \hat{r}_{12} \\ \hat{r}_{13} \\ \hat{r}_{14} \\ \hat{r}_{15} \\ \hat{r}_{16} \\ \hat{r}_{17} \\ \hat{r}_{18} \\ \hat{r}_{19} \\ \hat{r}_{20} \\ \hat{r}_{21} \end{bmatrix}$$

In accordance with the present invention, the introduction of the chain rule into the solution of the problem provides a customization of the interior point method that reduces the number of iterations that are performed—which also reduces the chance that the solution will not converge.

The above matrix problem is split into several subsystems, using the chain rule. The utilization of the chain rule allows for the branch and bound method to be utilized and arrive at a solution in a relatively few number of iterations. Indeed, it is an important aspect of the present invention that the utilization of the chain rule results in reducing the original system of equations to an "atomic" system that is the smallest possible set of equations that fully and accurately solves the OPF problem. Therefore, the approach of the present invention allows for a complete solution without the need to introduce some of the constraints associated with other interior point methods, and yet is more efficient and cost effective than these prior art IPM approaches.

The following is a set of equations that are defined in this reduced Newton system using this process in accordance with the present invention, where the parenthetical defines the particular "row" of the matrix system from above:

$$\Rightarrow \Delta t = \hat{r}_9 + B_* \Delta u_* + B_{} \Delta u_{} + B_0 \Delta u_0 \qquad (9)$$

$$\Rightarrow \Delta x = -\hat{r}_8 + A \Delta t \qquad (8)$$

--- - ---

$$\Rightarrow \Delta y_x = -D_1^{-1}(\hat{r}_{13} + \Delta x) \qquad (13)$$

$$\Rightarrow \Delta y_t = -D_2^{-1}(\hat{r}_{14} + \Delta t) \qquad (14)$$

$$\Rightarrow \Delta y_{\underline{D}u^*} = -D_3^{-1}(\hat{r}_{15} + \Delta u_* + D_{u_*} \Delta z_*) \qquad (15)$$

$$\Rightarrow \Delta y_{\overline{D}_{u^*}} = -D_4^{-1}(\hat{r}_{16} - \Delta u_* - D_{u_*} \Delta z_*) \qquad (16)$$

$$\Rightarrow \Delta y_{\underline{D}u^{}} = -D_5^{-1}(\hat{r}_{17} + \Delta u_{} + D_{u_{}} \Delta z_{}) \qquad (17)$$

$$\Rightarrow \Delta y_{\overline{D}_{u^{}}} = -D_6^{-1}(\hat{r}_{18} - \Delta u_{} - D_{u_{}} \Delta z_{}) \qquad (18)$$

$$\Rightarrow \Delta y_{u_0} = -D_7^{-1}(\hat{r}_{19} + \Delta u_0) \qquad (19)$$

$$\Rightarrow \Delta y_{z_*} = -D_8^{-1}(\hat{r}_{20} + \Delta z_*) \qquad (20)$$

$$\Rightarrow \Delta y_{z_{}} = -D_9^{-1}(\hat{r}_{21} + \Delta z_{}) \qquad (21)$$

--- - ---

$$\Rightarrow \Delta z^* = -D_{z*}^{-1}(\hat{r}_6 - N_{z*}^T \Delta y_{n_{z*_A}} y_{N_{z**_t}} D_{u_*} \Delta y_{D_{u_*}} - \overline{D_{u_*}} \Delta y_{\overline{D}_{u_*}} + \Delta y_{z*}) \qquad (6)$$

$$\Rightarrow \Delta z_{} = -D_{z}^{-1}(\hat{r}_7 - N_{z}^T \Delta y_{N_{z}} + D_{u} \Delta y_{D_{u}} - \overline{D_{u}} \Delta y_{\overline{D}_{u}} + \Delta y_{z**}) \qquad (7)$$

--- - ---

$$\Rightarrow \Delta y_A = \hat{r}_1 + \hat{Q}_x \Delta x + \Delta y_x \qquad (1)$$

$$\Rightarrow \Delta y_B = \hat{r}_2 + \hat{Q}_t \Delta t + A^T \Delta y_A + \Delta y_t \qquad (2)$$

From a review of the above equations, it is found that there remain a small set of the original reduced Newton system that have not been used (namely, equations (3), (4), (5), (10), (11) and (12). These equations are shown below:

$$\hat{Q}_{\tilde{u}} \Delta u_* + B_*^T \Delta y_B + M_{u_*} \Delta y_{N_{u_*}} - \Delta y_{D_{u_*}} + \Delta y_{\overline{D}_{u_*}} = 0 \qquad (3)$$

$$\hat{Q}_{\tilde{u}} \Delta u_{} + B_{}^T \Delta y_B - N_{u}^T \Delta y_{N_{u**} - \Delta_y D_{u*}} + \Delta y_{\overline{D}_{u**}} = 0 \qquad (4)$$

$$\hat{Q}_{u_0} \Delta u_0 + B_0^T \Delta y_B + \Delta y_{u_{0=0}} \qquad (5)$$

$$N_{z*} \Delta z_* = 0 \qquad (10)$$

$$-M_z \Delta z_* + N_{z} \Delta z_{} = 0 \qquad (11)$$

$$-M_u \Delta u_* + N_{u} \Delta u_{} = 0 \qquad (12)$$

By making the proper substitutions from equations (9), (8), (13)-(21), (6), (7), (1) and (2) into the above set, the result is a linear set of six equations in six unknowns, characterized in the following form:

$$\begin{bmatrix} F_1 & F_2 & F_3 & F_4 & F_5 & F_6 \\ F_7 & F_8 & F_9 & F_{10} & F_{11} & F_{12} \\ F_{13} & F_{14} & F_{15} & 0 & 0 & 0 \\ F_{16} & 0 & 0 & 0 & F_{17} & F_{18} \\ F_{19} & F_{20} & 0 & 0 & F_{21} & F_{22} \\ F_{23} & F_{24} & 0 & 0 & 0 & 0 \end{bmatrix} \begin{bmatrix} \Delta u_* \\ \Delta u_{} \\ \Delta u_0 \\ \Delta y_{N_{u}} \\ \Delta y_{N_{z*}} \\ \Delta y_{N_{z**}} \end{bmatrix} = \begin{bmatrix} f_1 \\ f_2 \\ f_3 \\ f_4 \\ f_5 \\ f_6 \end{bmatrix},$$

where $F_i$ are matrices of appropriate dimensions. This is indeed the smallest system of equations that can be utilized to solve the OPF problem and maintain the integrity of the original problem statement. Inasmuch as the problem has been reduced to a system of six equations with six unknowns, it is simplified to the point of requiring fewer iterations and is less expensive and time-consuming to arrive at a solution.

It is to be understood that this invention is not to be limited by the embodiment shown in the drawings and described in the description, which is given by way of example and not of limitation, but only in accordance with the scope of the claims appended hereto.

What is claimed is:

1. An optimal power flow (OPF) method of operating a power system, comprising the steps of:
   a) determining power flows for a base case operation and at least one contingency case operation of the power system, defined as an original discrete OPF problem;

b) modifying the original discrete OPF problem to eliminate binary variables and introduce continuous relaxation of the original discrete OPF problem;
c) introducing slack variables to transform inequalities present in the original discrete OPF problem, forming an "equality constrained" problem;
d) applying an interior point method to produce a solution to the continuous relaxation;
e) creating a reduced Newton system of equations defining the solution to the continuous relaxation;
f) applying a chain rule process to the reduced Newton system of equations to create an irreducible set of linear equations defining the original discrete OPF problem;
g) solving the irreducible set of linear equations and generating a solution to the original discrete OPF problem; and
h) operating the power system according to the solution to the original discrete OPF problem;
wherein in performing step a), the original discrete OPF problem is defined as follows:

min $q(w) = \frac{1}{2}x^T Q_x x + c_x^T x + \frac{1}{2}t^T Q_t t + c_t^T t +$ $\frac{1}{2}u_*^T Q_{u*} u_* + c_{u*}^T u_* + \frac{1}{2}u_{}^T Q_{u} u_{} + c_{u}^T u_{**} +$ $\frac{1}{2}u_0^T Q_{u0} u_0 + c_{u0}^T u_0$ s.t. $x - At = 0$ $t - B_0 u_0 - B_* u_* - B_{} u_{} - H_0 z_0 = 0$ $N_{z*} z_* = 1$ $N_{z} z_{} - M_z z_* = 0$ $N_u u_{**} - M_u u_* = 0$ $0 \leq x \leq d_x$ $0 \leq t \leq d_t$ $\underline{D} u_* z_* \leq u_* \leq \overline{D} u_* z_*$ $\underline{D} u_{} z_{} \leq u_{} \leq \overline{D} u_{} z_{**}$ $0 \leq u_0 \leq d_{u0}$ $z_* \in \{0,1\}^{n_{x*}}$ $z_{} \in \{0,1\}^{n_{x}}$ where x stores bus-dependent variables; a subscript x indicates a bus-dependent variable at position x; t stores branch-dependent variables; u stores bus and branch control variables; Q represents reactive power constraints, c represents other constraints; the constraint $x - At = 0$ represents flow balance for the power system; the constraint $t - B_0 u_0 - B_* u_* - B_{} u_{} - H_0 z_0 = 0$ represents a discretized voltage law defined for each bus; the constraints $N_{z*} z_* = 1$, $N_{z} z_{} - M_z z_* = 0$ and $N_u u_{**} - M_u u_* = 0$ model special order set-type 1 constraints; $\overline{D}$ stores upper bounds for x, t and u; $\underline{D}$ stores lower bounds for x, t and u; $z_*$ and $z_{**}$ are used to test local variables within $\overline{D}$ and $\underline{D}$; and $d_x$ and $d_t$ are bounds for x and t, respectively.

2. The method as defined in claim 1 wherein in performing step b) the binary variables are redefined to have a continuous value of no greater than one.

3. The method as defined in claim 1 wherein in performing step d) the interior point method defines a barrier function and a weighting parameter for approaching the barrier function.

4. The method as defined in claim 1 wherein in performing step f), the following system is created:

$$\begin{bmatrix} F_1 & F_2 & F_3 & F_4 & F_5 & F_6 \\ F_7 & F_8 & F_9 & F_{10} & F_{11} & F_{12} \\ F_{13} & F_{14} & F_{15} & 0 & 0 & 0 \\ F_{16} & 0 & 0 & 0 & F_{17} & F_{18} \\ F_{19} & F_{20} & 0 & 0 & F_{21} & F_{22} \\ F_{23} & F_{24} & 0 & 0 & 0 & 0 \end{bmatrix} \begin{bmatrix} \Delta u_* \\ \Delta u_{} \\ \Delta u_0 \\ \Delta y_{N_{u}} \\ \Delta y_{N_{z*}} \\ \Delta y_{N_{z**}} \end{bmatrix} = \begin{bmatrix} f_1 \\ f_2 \\ f_3 \\ f_4 \\ f_5 \\ f_6 \end{bmatrix},$$

where $F_i$ are matrices of appropriate dimensions comprising coefficients of the irreducible set of linear equations; the vectors u store bus and branch control variables; the vectors $y_N$ model bus characteristics; and f is a vector of constant terms of the irreducible set of linear equations.

5. An optimal power flow (OPF) method of operating a power system, comprising the steps of:
a) determining power flows for a base case operation and at least one contingency case operation of the power system, defined as an original discrete OPF problem;
b) modifying the original discrete OPF problem to eliminate binary variables and introduce continuous relaxation of the original discrete OPF problem;
c) introducing slack variables to transform inequalities present in the original discrete OPF problem, forming an "equality constrained" problem;
d) applying an interior point method to produce a solution to the continuous relaxation;
e) creating a reduced Newton system of equations defining the solution to the continuous relaxation;
f) applying a chain rule process to the reduced Newton system of equations to create an irreducible set of linear equations defining the original discrete OPF problem;
g) solving the irreducible set of linear equations and generating a solution to the original discrete OPF problem; and
h) operating the power system according to the solution to the original discrete OPF problem;
wherein in performing step f), the following system is created:

$$\begin{bmatrix} F_1 & F_2 & F_3 & F_4 & F_5 & F_6 \\ F_7 & F_8 & F_9 & F_{10} & F_{11} & F_{12} \\ F_{13} & F_{14} & F_{15} & 0 & 0 & 0 \\ F_{16} & 0 & 0 & 0 & F_{17} & F_{18} \\ F_{19} & F_{20} & 0 & 0 & F_{21} & F_{22} \\ F_{23} & F_{24} & 0 & 0 & 0 & 0 \end{bmatrix} \begin{bmatrix} \Delta u_* \\ \Delta u_{} \\ \Delta u_0 \\ \Delta y_{N_{u}} \\ \Delta y_{N_{z*}} \\ \Delta y_{N_{z**}} \end{bmatrix} = \begin{bmatrix} f_1 \\ f_2 \\ f_3 \\ f_4 \\ f_5 \\ f_6 \end{bmatrix},$$

where $F_i$ are matrices of appropriate dimensions comprising coefficients of the irreducible set of linear equations; the vectors u store bus and branch control variables; the vectors $y_N$ model bus characteristics; and f is a vector of constant terms of the irreducible set of linear equations.

6. The method as defined in claim 5 wherein in performing step b) the binary variables are redefined to have a continuous value of no greater than one.

7. The method as defined in claim 5 wherein in performing step d) the interior point method defines a barrier function and a weighting parameter for approaching the barrier function.

8. The method as defined in claim 5 wherein in performing step a), the original discrete OPF problem is defined as follows:

min $$q(w) = \tfrac{1}{2}x^T Q_x x + c_x^T x + \tfrac{1}{2}t^T Q_t t + c_t^T t +$$

$$\tfrac{1}{2}u_*^T Q_{u*} u_* + c_{u*}^T u_* + \tfrac{1}{2}u_{}^T Q_{u} u_{} + c_{u}^T u_{**} +$$

$$\tfrac{1}{2}u_0^T Q_{u0} u_0 + c_{u0}^T u_0$$

s.t. $x - At = 0$ $t - B_0 u_0 - B_* u_* - B_{} u_{} - H_0 z_0 = 0$ $N_{z*} z_* = 1$ $N_{z} z_{} - M_z z_* = 0$ $N_u u_{**} - M_u u_* = 0$ $0 \leq x \leq d_x$ $0 \leq t \leq d_t$ $\underline{D} u_* z_* \leq u_* \leq \overline{D} u_* z_*$ $\underline{D} u_{} z_{} \leq u_{} \leq \overline{D} u_{} z_{**}$ $0 \leq u_0 \leq d_{u0}$ $z_* \in \{0,1\}^{n_{x*}}$ $z_{} \in \{0,1\}^{n_{x}}$ where x stores bus-dependent variables; a subscript x indicates a bus-dependent variable at position x; t stores branch-dependent variables; u stores bus and branch control variables; Q represents reactive power constraints, c represents other constraints; the constraint $x - At = 0$ represents flow balance for the power system; the constraint $t - B_0 u_0 - B_* u_* - B_{} u_{} - H_0 z_0 = 0$ represents a discretized voltage law defined for each bus; the constraints $N_{z*} z_* = 1$, $N_{z} z_{} - M_z z_* = 0$ and $N_u u_{**} - M_u u_* = 0$ model special order set-type 1 constraints; $\overline{D}$ stores upper bounds for x, t and u; $\underline{D}$ stores lower bounds for x, t and u; $z_*$ and $z_{**}$ are used to test local variables within $\overline{D}$ and $\underline{D}$; and $d_x$ and $d_t$ are bounds for x and t, respectively.

\* \* \* \* \*